(12) United States Patent
Gibson et al.

(10) Patent No.: US 7,571,841 B2
(45) Date of Patent: Aug. 11, 2009

(54) INTERCHANGEABLE ADAPTER FOR IN-CAN AND ON-CAN FUEL CELLS

(75) Inventors: Eric S. Gibson, Round Lake, IL (US); James A. Purpura, Cary, IL (US); Thomas E. Webb, Lisle, IL (US); Maureen L. Shea, Wilmette, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 12/015,227

(22) Filed: Jan. 16, 2008

(65) Prior Publication Data

US 2008/0110953 A1      May 15, 2008

Related U.S. Application Data

(63) Continuation-in-part of application No. 10/827,551, filed on Apr. 19, 2004, now Pat. No. 7,392,922, and a continuation-in-part of application No. 11/810,238, filed on Jun. 5, 2007, now Pat. No. 7,478,740.

(60) Provisional application No. 60/881,924, filed on Jan. 22, 2007.

(51) Int. Cl.
  *B25C 1/12* (2006.01)
  *F16L 37/04* (2006.01)
(52) U.S. Cl. .................................... 227/10; 227/130
(58) Field of Classification Search ............. 227/8, 227/9, 10, 130; 222/402.1, 402.16, 402.78; 285/3, 4
See application file for complete search history.

(56) References Cited

U.S. PATENT DOCUMENTS

| | | | |
|---|---|---|---|
| 2,828,892 A | 4/1958 | Ward | |
| 2,998,168 A | 8/1961 | Waldherr | |
| 3,073,489 A | 1/1963 | Friedman | |
| 3,610,481 A | 10/1971 | Marraffino | |
| 4,207,934 A * | 6/1980 | Scremin et al. | 141/383 |
| 4,331,119 A | 5/1982 | Chadwick | |
| 4,331,277 A | 5/1982 | Green | |
| 4,403,722 A | 9/1983 | Nikolich | |
| 4,483,474 A | 11/1984 | Nikolich | |
| 4,522,162 A | 6/1985 | Nikolich | |
| 4,721,240 A | 1/1988 | Cotta | |
| 4,902,043 A * | 2/1990 | Zillig et al. | 285/4 |

(Continued)

FOREIGN PATENT DOCUMENTS

DE      198 53 555 A1      5/2000

(Continued)

*Primary Examiner*—Paul R Durand
(74) *Attorney, Agent, or Firm*—Greer, Burns & Crain, Ltd.; Mark W. Croll; Christopher P. Rauch (57) ABSTRACT

An adapter configured for use in combination with a cap on a fuel cell having a closure formation, the cap having at least one leg portion and a corresponding foot extending from the leg, including a ring portion configured for engagement upon the closure formation of the fuel cell and including a top edge, a bottom edge, and a sidewall therebetween having an inner sidewall and an outer sidewall, a grooved portion defined by the inner sidewall, a convex gripping formation on the outer sidewall complementary to the closure formation, and at least one recessed formation adjacent the grooved portion for receiving the foot.

18 Claims, 9 Drawing Sheets

U.S. PATENT DOCUMENTS

| | | |
|---|---|---|
| 5,115,944 A | 5/1992 | Nikolich |
| 5,169,038 A | 12/1992 | Di Giovanni |
| 5,211,316 A | 5/1993 | Adalberto et al. |
| 5,263,439 A | 11/1993 | Doherty et al. |
| 5,368,231 A | 11/1994 | Brunerie et al. |
| 5,482,083 A * | 1/1996 | Jenski .................. 137/614.03 |
| 5,632,421 A | 5/1997 | Colombo |
| 5,695,096 A | 12/1997 | Yquel |
| 5,697,532 A | 12/1997 | Wilde et al. |
| 5,730,326 A | 3/1998 | Kaeser |
| 5,904,274 A | 5/1999 | Warby et al. |
| 5,927,563 A | 7/1999 | Kellner |
| 6,058,960 A | 5/2000 | Kopp |
| 6,085,945 A | 7/2000 | Fransen |
| 6,202,900 B1 | 3/2001 | Tsutsui et al. |
| 6,217,085 B1 * | 4/2001 | Toulouse .................. 285/319 |
| 6,302,297 B1 | 10/2001 | Richardson et al. |
| 6,311,876 B1 | 11/2001 | Liu |
| 6,315,173 B1 | 11/2001 | Di Giovanni et al. |
| 6,419,168 B1 * | 7/2002 | Thieleke et al. ............. 239/337 |
| 6,520,377 B2 | 2/2003 | Yquel |
| 6,523,860 B1 * | 2/2003 | Shkolnikov et al. ............ 285/3 |
| 6,543,814 B2 * | 4/2003 | Bartholomew .............. 285/319 |
| 6,578,573 B2 * | 6/2003 | Koch ..................... 128/202.27 |
| 6,644,306 B1 | 11/2003 | Riebe et al. |
| 6,681,955 B2 | 1/2004 | Rosenbaum |
| 6,796,478 B2 * | 9/2004 | Shkolnikov et al. ........... 227/10 |
| 2004/0206798 A1 | 10/2004 | Robinson |
| 2005/0230451 A1 | 10/2005 | Vanstaan et al. |

FOREIGN PATENT DOCUMENTS

| | | |
|---|---|---|
| DE | 198 53 556 C1 | 6/2000 |
| DE | 198 53 554 C1 | 7/2000 |
| DE | 201 14 780 U1 | 2/2002 |
| GB | 1 525 440 | 9/1978 |

* cited by examiner

INTERCHANGEABLE ADAPTER FOR IN-CAN AND ON-CAN FUEL CELLS

CROSS REFERENCE TO RELATED APPLICATIONS

This application is a continuation-in-part of application U.S. Ser. No. 10/827,551 filed Apr. 19, 2004, now U.S. Pat. No. 7,392,922 and entitled IN-CAN FUEL METERING VALVE, a continuation-in-part of application U.S. Ser. No. 11/810,238 filed Jun. 5, 2007, now U.S. Pat. No. 7,478,740 and entitled ENHANCED FUEL PASSAGEWAY AND ADAPTER FOR COMBUSTION TOOL FUEL CELL, and a continuation-in-part of U.S. Ser. No. 60/881,924 filed Jan. 22, 2007 entitled INTERCHANGEABLE IN-CAN AND ON-CAN ADAPTER FOR IN-CAN FUEL CELL, herein incorporated by reference.

FIELD OF THE INVENTION

This invention relates generally to improvements in fuel cell fuel delivery arrangements for use in combustion tools, and more specifically to an interchangeable adapter for use on both an in-can and an on-can fuel cell for delivering the appropriate amount of fuel for use by a combustion tool during the driving of fasteners. While the present application is focused on the use of fuel cells in combustion tools, other applications are contemplated in which fuel cells or other pressurized containers using stem valves are employed, such as, but not limited to, cosmetics and pharmaceutical products.

As exemplified in Nikolich U.S. Pat. Nos. 4,403,722; 4,483,474; 4,522,162; and 5,115,944, all of which are incorporated by reference, it is known to use a dispenser such as a fuel cell to dispense a hydrocarbon fuel to a combustion tool, also known as a combustion gas-powered tool, such as, for example, a combustion gas-powered fastener-driving tool, also known as a combustion nailer. Such fastener-driving tools and fuel cells are available commercially from ITW-Paslode (a division of Illinois Tool Works, Inc.) of Vernon Hills, Ill., under its IMPULSE trademark.

One design criteria associated with the use of such fuel cells, which contain separate compartments of pressurized fuel and propellant, is the prevention of leakage of one or both of the above constituents. The objective is to prevent or minimize leakage during the period after production and before use, also known as shelf life, and also during periods when the fuel cell is installed in the tool but the tool is stored or otherwise not in use. As with other aerosol containers, a certain amount of leakage occurs over time. However, in the environment of combustion nailers, there is a concern that gradual leakage over a prolonged shelf life may result in reduced performance of the fuel cell due to insufficient propellant and/or fuel. Accordingly, the present manufacturer recommendations call for a 12-18 month maximum shelf life of such fuel cells to ensure that sufficient propellant and/or fuel remains for expected performance needs.

Another design criterion of such fuel cells is that only a desired amount of fuel or dose of fuel should be emitted by the fuel cell for each combustion event. The amount of fuel should be carefully monitored to provide the desired combustion, yet in a fuel-efficient manner to prolong the working life of the fuel cell. Prior attempts to address this dosage factor have resulted in fuel metering valves located in the tool (U.S. Pat. No. 5,263,439) or attached to the fuel cell (U.S. Pat. No. 6,302,297), both of which are also incorporated by reference. Fuel cells have also been introduced having internal metering valves ("in-can"), as disclosed in commonly assigned U.S. patent application Ser. No. 10/827,551, filed Apr. 19, 2004.

Fuel cells configured for use with external metering valves are similar in external appearance to fuel cells having internal metering valves. While adapters are known for improving performance of such combustion nailers (U.S. Pat. No. 6,796, 478), and the external or "on-can" fuel cell metering valves of U.S. Pat. No. 6,302,297 are provided with fuel cells upon purchase, through use, it has been known for such adapters and/or valves to become dislodged from the fuel cell. This results in fuel cells having similar external appearance, but having distinct and incompatible internal performance components.

Regardless of the location of the metering valve, the associated combustion nailer is designed to exert a force on the valve, either on the reciprocating valve stem or on the valve body itself, to cause the stem to retract against a biasing force in the metering valve to dispense a measured dose of fuel. It is important for fuel economy in the fuel cell, and desired operation of the combustion nailer, for only the designated amount of fuel to be supplied to the tool on a dosage basis. Accordingly, it is also material that users of such tools associate the appropriate type of fuel cell with the appropriate tool and the corresponding metering system. It is also important that the combustion nailer be readily associated with the appropriate fuel cell.

Another design criterion of metering valves is fuel leakage. In the case of an internal tool fuel-metering valve, an excessive number of seal locations inherently create multiple opportunities for leaks. In the case of external fuel cell metering valves, to facilitate disposability of the fuel cell and valve, inexpensive materials are used.

Another design criterion of such fuel cells is that when metering valves are attached to the fuel cell, there is some duplication of components, in that a first valve controls the flow of fuel from the cell, and a second valve controls a metered dose of fuel for delivery to the tool for a single combustion event. Such duplication increases the potential for fuel leaks.

Yet another design factor of fuel cell-mounted metering valves is that once the metering valve is operationally installed, the main fuel cell valve stem is continuously open. Thus, the nature of the seal formed by the main fuel cell valve stem changes from a face seal to a radial seal about the valve stem. In this position, the seal is relaxed and provides less effective sealing. As such, there is a greater potential for fuel leakage from the fuel cell.

BRIEF DESCRIPTION OF THE INVENTION

The above-listed needs are met or exceeded by the present interchangeable adapter for an in-can and an on-can fuel cell. An advantage of the present adapter is that it is configured for use with both an in-can cap and an on-can metering valve, increasing the efficiency of the fuel cell, in that a single fuel cell can be used with a variety of tools. The present adapter is also configured to provide a secure connection to the fuel cell, preventing premature removal of the adapter. Further, the adapter is constructed and arranged to provide an improved seal between the fuel cell and the on-can metering valve, preventing leakage and improving the shelf life of the fuel cell.

More specifically, an adapter is provided and configured for use in combination with a cap on a fuel cell having a closure formation, the cap having at least one leg portion and a corresponding foot extending from the leg, including a ring portion configured for engagement upon the closure formation of the fuel cell and including a top edge, a bottom edge, and a sidewall therebetween having an inner sidewall and an outer sidewall, a grooved portion defined by the inner sidewall, a convex gripping formation on the outer sidewall complementary to the closure formation, and at least one recessed formation adjacent the grooved portion for receiving the foot.

DETAILED DESCRIPTION OF THE INVENTION

Figure 1:
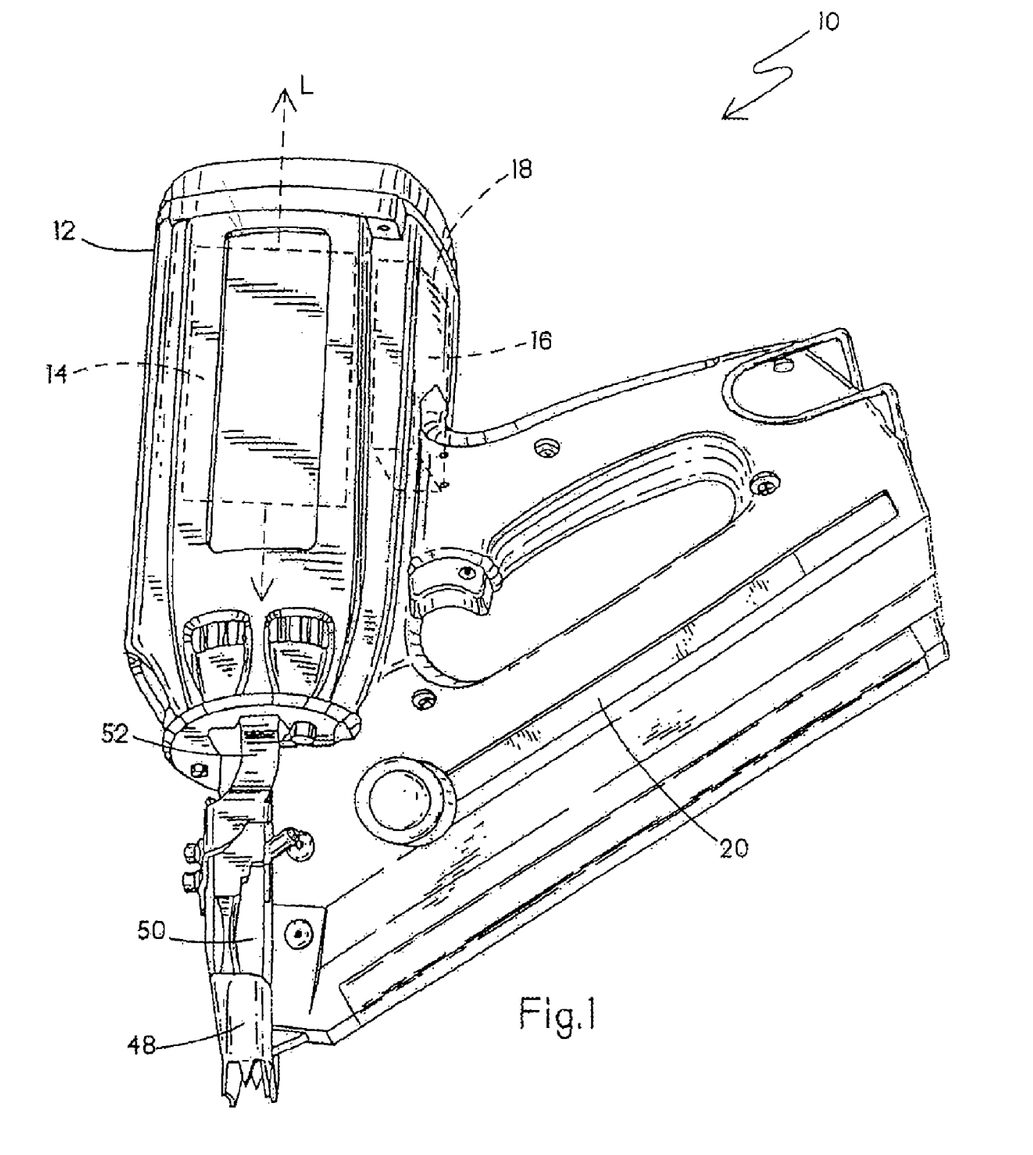
FIG. 1 is a perspective view of an in-can type combustion tool suitable for use with the present adapter.
Figure 2:
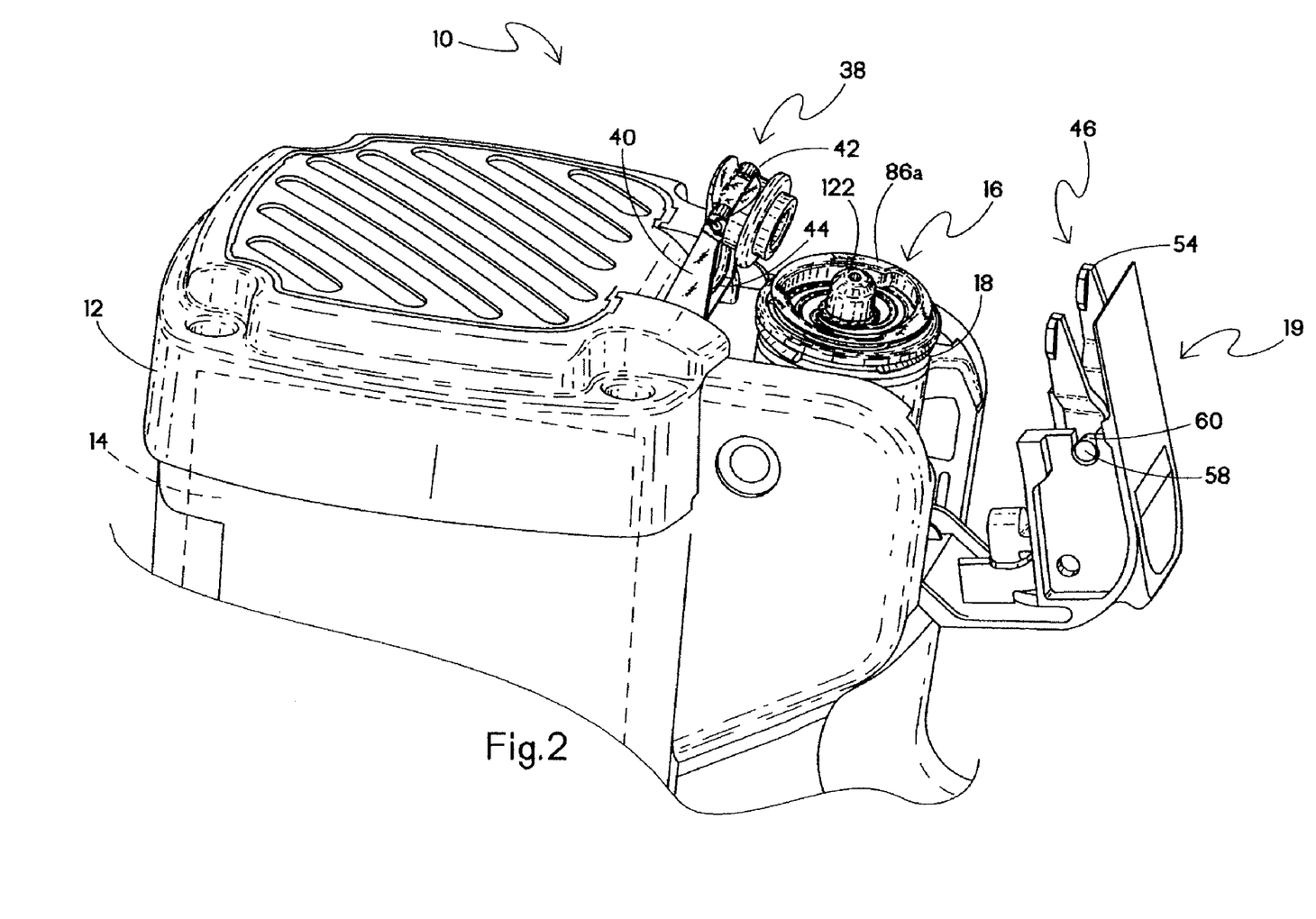
FIG. 2 is a fragmentary top perspective view of the in-can type combustion tool shown in FIG. 1 with an in-can fuel cell being inserted.
Figure 4:
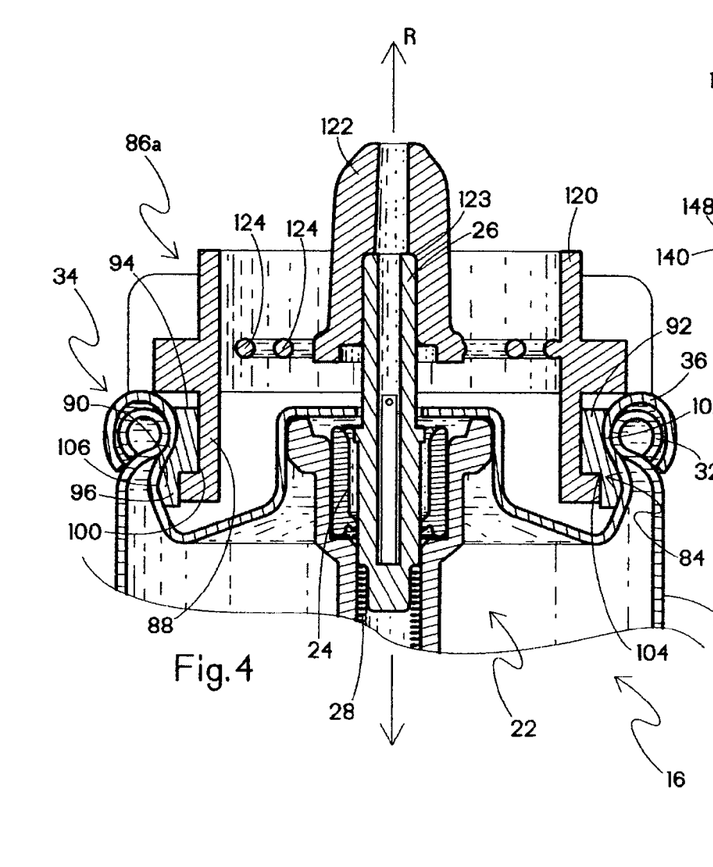
FIG. 4 is a fragmentary vertical cross-section of an in-can fuel cell equipped with the present adapter and an in-can cap.

Referring to FIGS. 1, 2 and 4, an in-can type combustion tool is shown and generally designated 10, and includes a main tool housing 12 enclosing a combustion chamber 14 (shown hidden). An in-can fuel cell 16 is inserted into a fuel cell chamber 18 (shown hidden) arranged generally parallel to a longitudinal axis 'L' of the combustion chamber 14. As seen in FIG. 1, the fuel cell 16 is inserted into the chamber 18 to be generally at a transverse or oblique angle to a fastener magazine 20. A fuel cell door 19 (FIG. 2) is pivotally engaged on the housing 12 and is configured to close the fuel cell chamber 18 during tool operation.

The particular construction of the present fuel cell 16, designated "in-can" because it has an internal fuel-metering valve 22 including a fuel-metering chamber 24, is described in detail in co-pending U.S. Ser. No. 10/827,551 which has been incorporated by reference. Generally speaking, a fuel valve stem 26 is biased to a closed or rest position (FIG. 4), as by a spring 28, but when axially depressed, the valve stem reciprocates relative to the housing 12 and a measured dose of fuel is dispensed from the fuel metering chamber 24 and out the valve stem. Upon withdrawal of the axial force, the stem 26 resumes its rest position, and a subsequent dose of fuel flows into the metering chamber 24 for the next firing cycle.

Referring to FIG. 4, the fuel cell 16 generally includes an outer housing or shell 30 defining an open upper end 32 enclosed by a closure 34 which is sealingly secured to the housing at a peripheral edge 36 which overlaps and is preferably crimped over the upper end, as well known in the art. The general construction of such fuel cells 16 is disclosed in U.S. Pat. No. 5,115,944, incorporated by reference herein. As will be described below, the present adapter is also usable with a conventional fuel cell 16a not having an internal metering valve as described in the '944 patent.

Best seen in FIG. 2, the tool 10 further includes a fuel cell actuator assembly 38 in operational relationship with the fuel cell chamber 18 including at least one generally elongate actuator element 40 constructed and arranged for exerting an axial force on the fuel valve stem 26. This axial force causes the stem 26 to dispense a measured dose of fuel to the combustion chamber 14 prior to each combustion event to initiate combustion. The actuator assembly 38 includes an actuator block 42 which delivers fuel to a fuel conduit 44 and ultimately to the combustion chamber 14. Also included on the actuator assembly 38 is a pivot member 46 on the door 19 provided for transmitting the axial force to the actuator block 42 which dispenses the measured dose of fuel from the fuel cell 16. This force originates through the retraction of a workpiece contact element 48 (FIG. 1), depending from a lower end of the tool. As the tool 10 is pressed against a workpiece (not shown) prior to driving a fastener, the workpiece contact element 48 retracts relative to a nosepiece 50. This retraction is used to mechanically trigger other operations of the tool 10, such as the closing of the combustion chamber 14, as is well known in the art. In the present application, the movement of the workpiece contact element 48 relative to the nosepiece 50 is also used to initiate the axial force on the fuel valve stem 26 to dispense the fuel.

More specifically, the workpiece contact element 48 is mechanically coupled to a linkage 52, also known as an upper probe, and as the tool 10 is pressed against the workpiece, the workpiece contact element causes an upward movement of the linkage, which causes a pair of lugs located within the tool (not shown) to extend vertically and engage corresponding arms 54 of the pivot member 46, which is generally "U"-shaped when viewed from above. While other configurations are contemplated, corresponding ends of the arms 54 are preferably joined at a bar (not shown) in operational relationship to the actuator element 40.

A laterally extending lug 58 extends from the pivot member 46 and pivotally engages a corresponding socket or opening formation 60 in the fuel cell door 19. Thus, the pivot member 46 moves into and out of operation with the actuator element 40 with the movement of the linkage 52. Operation of the tool 10 will be described in further detail below.

Figure 3:
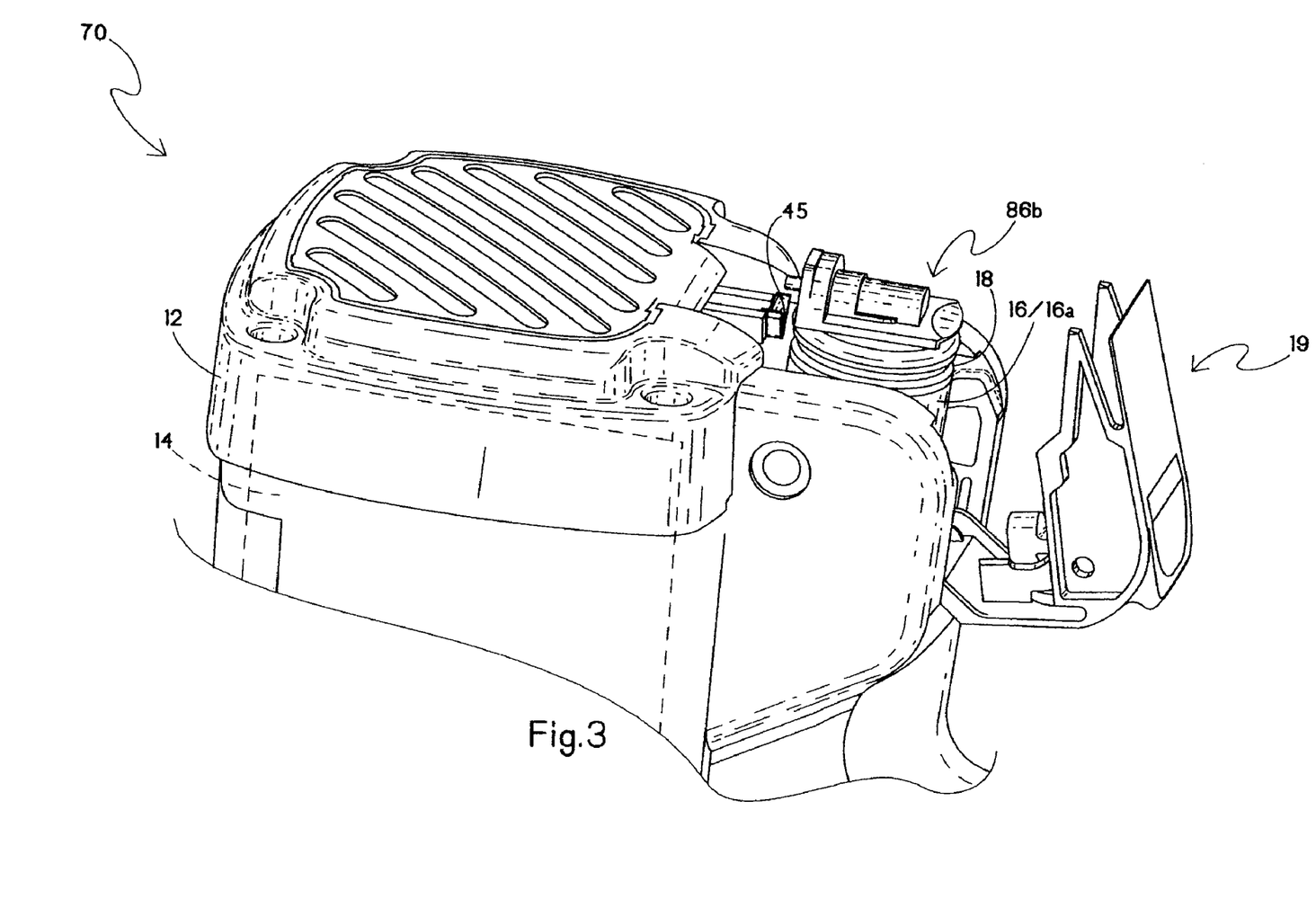
FIG. 3 is a fragmentary top perspective view of an on-can type combustion tool with an on-can fuel cell being inserted.

Referring now to FIG. 3, an on-can type combustion tool is fragmentarily shown and generally designated 70. Common components of the tool 10 and the tool 70 will be designated with identical reference numbers. The tool 70 is described in detail in U.S. Ser. No. 11/242,311 filed Oct. 3, 2005 and herein incorporated by reference. The tool 70 includes the same components as the tool 10, but does not include the actuator assembly 38 or the pivot member 46. To transport fuel from the fuel cell 16 to the combustion chamber 14, an on-can metering valve (described in further detail below) is engaged over the valve stem 26 and is aligned in fluid communication with a stem adapter 45. Operation of the tool 70 will be described in further detail below.

Typically, conventional on-can type combustion tools are configured for use with on-can fuel cells 16a. However, to enable use of the in-can fuel cell 16 with both the tool 10 and the tool 70, an adapter is provided and generally designated 84, as seen in FIGS. 4-9. The adapter 84 is configured for use in combination with a cap provided on the fuel cell 16, 16a and specifically with either an in-can cap 86a or an on-can metering valve or cap 86b, each of which will be described in further detail below. It will be understood that the in-can cap 86a is exclusively usable with the fuel cell 16, while the on-can valve 86b is usable on either fuel cell 16, 16a, however in come cases slight modification of the valve may be necessary for best results. Each of the caps 86a, 86b has at least one leg portion 88 and a corresponding foot 90 extending radially outwardly from an end of the leg. Preferably, the caps 86a, 86b include a pair of oppositely located legs 88 to provide a more stable attachment to the fuel cell 16, although it is appreciated that other configurations may be appropriate. Preferably still, the legs 88 extend from the cap 86a, 86b in a direction generally parallel to a longitudinal axis "R" of the fuel cell 16. Further, it is preferred that the corresponding foot 90 extends generally perpendicular to the leg 88. However, it is contemplated that other constructions may be suitable, depending on the application.

As seen in FIGS. 6-9, the adapter 84 includes a ring portion 92 configured for engagement upon the fuel cell closure 34 and includes a top edge 94, a bottom edge 96, and a sidewall 98 therebetween having an inner sidewall 100 and an outer sidewall 102. Preferably, the ring portion 92 is configured to grip the closure 34 to be non-rotatable with respect to the fuel cell 16 to prevent removal or damage of the adapter 84 after installation. It is contemplated that a thickness "T" of the ring portion 92 (FIG. 7) is sufficient to provide a friction fit between the cap leg 88 and the fuel cell closure portion 34.

Figure 6:
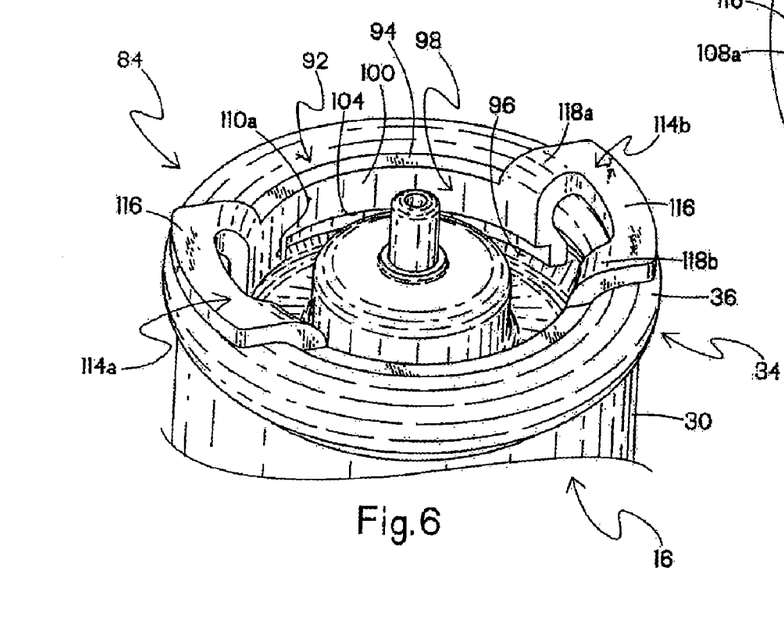
FIG. 6 is a top perspective view of the present adapter engaged with the in-can fuel cell of FIG. 4.
Figures 8, 9:
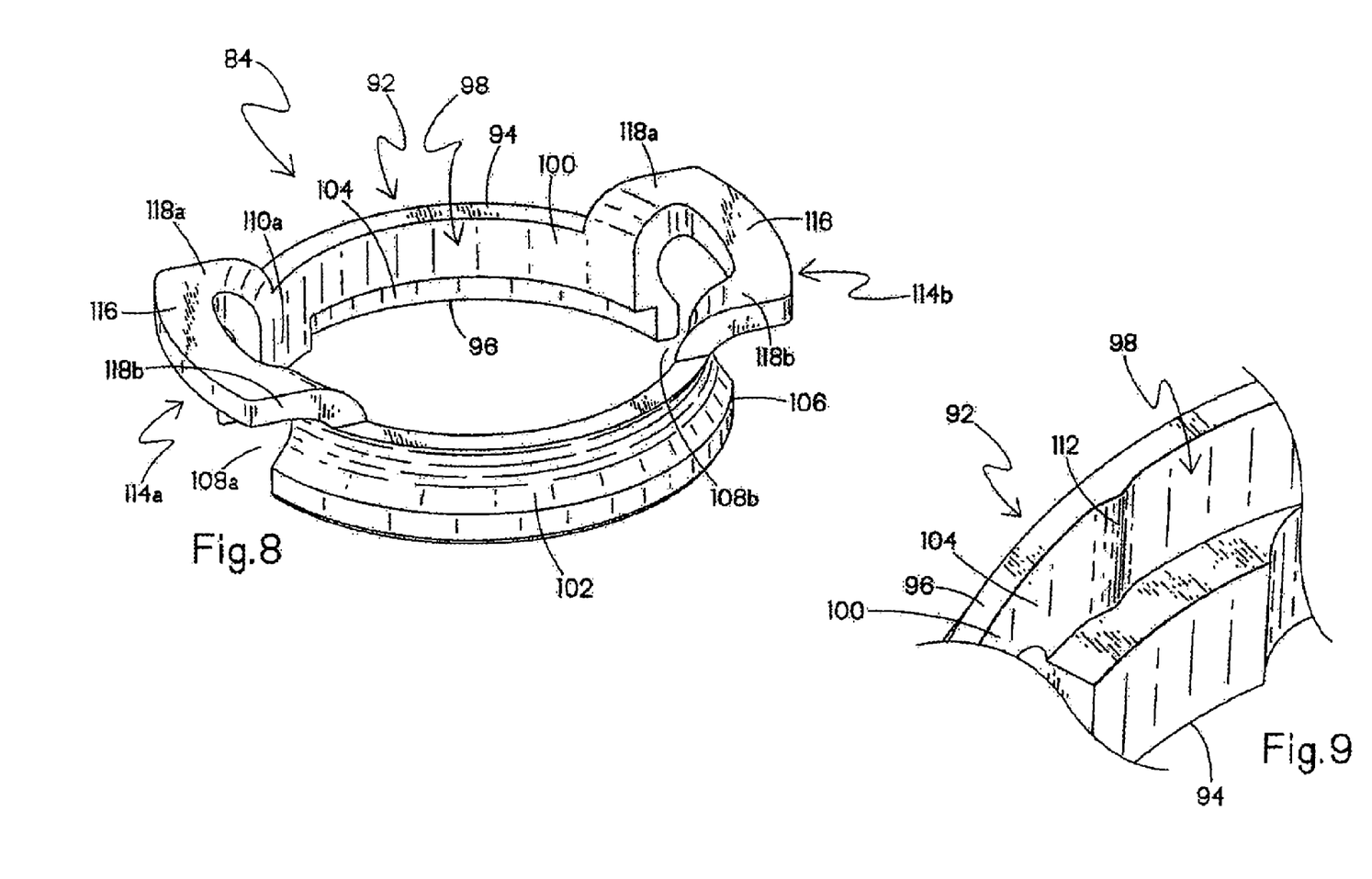
FIG. 8 is a top perspective view of the present adapter.
FIG. 9 is an inverted fragmentary perspective view of the adapter shown in FIG. 8.

As seen in FIGS. 6 and 8. the adapter 84 further includes a grooved portion that is an arcuate undercut 104 defined by the inner sidewall 100 at an end adjacent to the bottom 96 of the ring portion 92 and configured for receiving the feet 90 (not shown). A convex gripping formation 106 is defined on the outer sidewall 102 complementary to the closure formation 34. It is contemplated that the gripping formation 106 and the closure formation 34 provide a friction fit to provide a tight and secure connection between the adapter 84 and the fuel cell 16, although other similar configurations may be appropriate.

Figure 7:
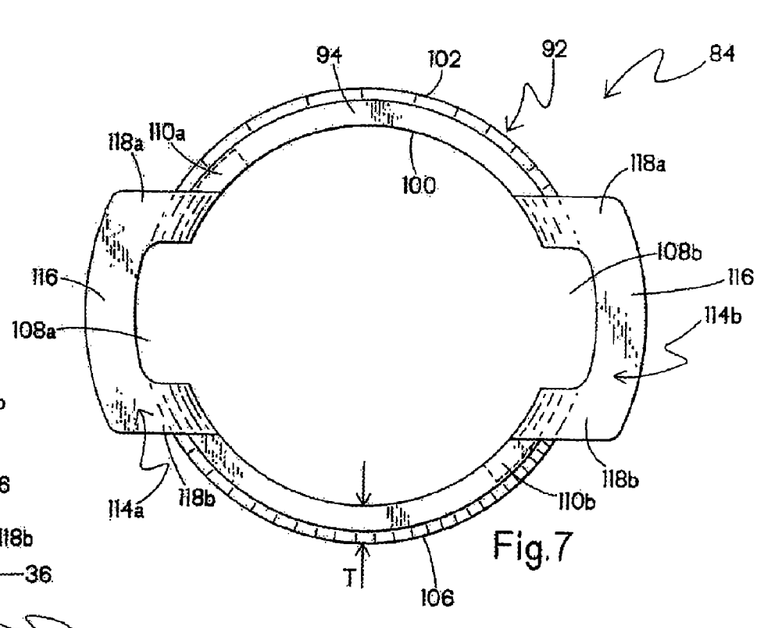
FIG. 7 is a top view of the present adapter.

Referring now to FIGS. 6 and 7, the adapter 84 includes at least one and preferably a pair of oppositely located recessed formations 108a, 108b, each configured for receiving a corresponding foot 90. The recessed formations 108a, 108b each include a corresponding stop 110a, 110b (shown hidden) located at corresponding ends of the undercut 104. Preferably still, the stops 110a, 110b are flush with the inner sidewall 100, although it is appreciated that other configurations may be appropriate. The stops 110a, 110b are constructed and arranged for preventing rotation of the cap foot 90 past the stop, although it is appreciated that other methods for preventing over-rotation of the caps 86a, 86b may be available, depending on the application. The undercut 104 further includes at least one radially outwardly projecting nodule 112 (FIG. 9) spaced from the stop 110a or 110b to define a space for receiving the foot 90 upon completion of installation and for further ensuring a secure connection between the adapter 84 and the fuel cell 16.

Best seen in FIGS. 7 and 8, the recessed formation 108 is preferably a gap defined between opposing ends of the ring portion 92. At least one and preferably a pair of tabs 114a, 114b extend radially from the top edge 94 and bridge the gaps 108a, 108b. Preferably, the tabs 114a, 114b are diametrically oppositely located on the top edge 94 to provide balance to the adapter 84. Each tab 114a, 114b preferably includes an arcuate handle 116 and a pair of arms 118a, 118b radially extending from the ring portion 92 and connected to the handle. It is contemplated that the arms 118a, 118b are shaped complementary to the peripheral edge 36. It is further contemplated that the handle 116 rests atop the peripheral edge 36 and serves as a gripping point for the user during attachment of the cap 86a or 86b to the adapter 84. However, it is recognized that other constructions are possible to suit the desired application.

As seen in FIG. 4, the in-can cap 86a includes a generally cylindrical adapter body 120 from which the leg 88 depends. A generally cylindrical hub 122 is preferably centrally located within the adapter body 120 and includes a cavity 123 for sealingly engaging the valve stem 26. The hub 122 is preferably reciprocally movable relative to the body 120, the reciprocal movement being provided by at least one flexible member 124 which is secured at a first end to the body and at an opposite end to the hub. Preferably, the flexible members 124 are spiral in shape and have a generally circular cross-section, although it is appreciated that other configurations may be suitable.

To secure the in-can cap 86a to the adapter 84, the user aligns the hub 122 with the valve stem 26 and also aligns the cap foot 90 with the recessed formation or gap 108. Once properly aligned, the hub 122 can be pushed onto the valve stem 26, and the cap 86a is turned or rotated until the feet 90 contact the corresponding stop 110a, 110b, sealably securing the cap to the valve stem 26. A contemplated feature of the present in-can cap 86a is that due to the configuration of the legs 88, the feet 90 and/or the hub 122, the in-can cap cannot be attached to an on-can fuel cell, preventing misuse of the cap. The user then inserts the fuel cell 16 into the fuel cell chamber 18, as shown in FIGS. 1 and 2.

Once the tool 10 is pressed against the workpiece and the workpiece contact element 48 is retracted relative to the tool, the linkage 52 extends upwardly, and the pivot member 46 is pivoted about lug 58, causing the bar (not shown) to axially depress the actuator element 40, which in turn presses the hub 122 downwardly against the valve stem 26 and causes the stem to reciprocate and release and dispense the measured amount of fuel. After firing of the tool 10, the force on the valve stem 26 and hub 122 is released, returning the tool to its rest position (FIG. 4) until the next firing cycle, and allowing the metering chamber 24 to be refilled.

The user can remove the cap 86a from the fuel cell by rotating the cap until the feet 90 are aligned with the recessed formations 108a, 108b and pulling axially away relative to the fuel cell to disengage the hub 122 from the valve stem 26. The user can now attach the valve 86b and use the fuel cell 16 in the on-can tool 70. Alternatively, upon emptying of the fuel cell 16, the user can install the cap 86a or valve 86b on another adapter-equipped fuel cell.

Figure 5:
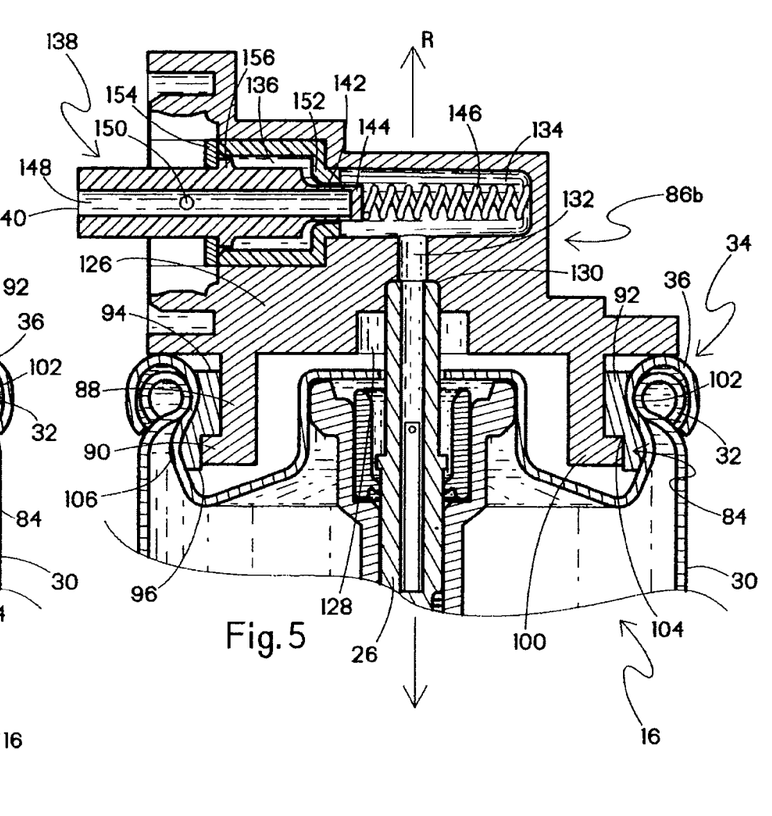
FIG. 5 is a fragmentary vertical cross-section of an in-can fuel cell equipped with the present adapter and an on-can metering valve.

Referring to FIG. 5, the on-can metering valve 86b preferably includes a body 126 having a generally centrally located cavity 128 constructed and arranged for sealingly engaging and being in fluid communication with the valve stem 26. As previously discussed in relation to the in-can cap 86a, the legs 88 depend from the body 126 in a direction generally parallel to the longitudinal axis "R" of the fuel cell 16, with the corresponding foot 90 extending radially outward and generally perpendicular to the leg. To prevent misuse, it is contemplated that the configuration of the on-can metering valve 86b prevents insertion onto a conventional on-can fuel cell.

The specific construction of the on-can metering valve 86b is discussed in further detail in commonly owned U.S. Pat. No. 6,302,297, which is incorporated herein by reference. Specifically, the cavity 128 includes an inlet end 130 in fluid communication with an intake orifice 132 that leads to a body chamber 134 that is preferably generally perpendicular to the intake orifice. Accordingly, fuel dispensed by the generally vertically oriented fuel cell 16 and valve stem 26 is diverted to a generally horizontal direction. The body chamber 134 is adjacent to, and in fluid communication with a metering chamber 136. A valve stem 138 extends into the on-can body 126 and has an outlet end 140 and a biased end 142.

A locating lug 144 is provided on the biased end 142, at a necked down portion of the valve stem 138, where a valve stem spring 146 disposed in the body chamber 134 engages the valve stem. The valve stem 138 also includes an internal passageway 148 extending from the locating lug 144 to the outlet end 140, and a valve stem orifice 150 in fluid communication with the passageway.

Best seen in FIG. 5, the metering chamber 136 includes a lip seal 152 that allows fuel to travel from the body chamber 134 to the metering chamber. Further, an outlet seal 154 is provided within the on-can valve body 126 to prevent leakage of any fuel contained within the metering chamber. A radial stop 156 provided on the valve stem 138 abuts the outlet seal 154 and further prevents leakage of fuel contained within the metering chamber 136.

To sealably secure the on-can metering valve 86b to the fuel cell 16, the user aligns the cavity 128 with the valve stem 26 and aligns the cap foot 90 with the corresponding recessed formation or gap 108a, 108b. Once properly aligned, the user turns the cap 86b until it reaches the corresponding stop 110a, 110b. The user then inserts the fuel cell 16 into the fuel cell chamber 18 as shown in FIG. 3, and aligns the metering valve stem outlet end 140 with the stem adapter 45.

Upon installation of the on-can metering valve 86b on the fuel cell 16, the fuel cell valve stem 26 is axially depressed to a fully retracted "container fill" position which enables full fluid communication with the body chamber 134. Once the fuel cell valve stem 26 is fully depressed, the fuel escapes from the fuel cell valve stem, through the intake orifice 132, and into the body chamber 134. From the body chamber 134, fuel flows between the lip seal 152 and the on-can valve stem 138 to fill the metering chamber 136. When the tool 70 is depressed against the workpiece, the metering valve stem 138 is forced inward or towards the body chamber 134, compressing the metering valve spring 146 far enough so that the valve stem orifice 150 is moved into the metering valve metering chamber 136. The fuel in the metering chamber 136 then travels through the metering valve stem orifice 150, into and through the metering valve stem 138, and finally through the stem adapter 45 and into the combustion chamber 14 for driving of the fastener into the workpiece.

It is contemplated that the construction of the on-can metering valve 86b provides an improved seal between the fuel cell 16 and the on-can metering valve, improving shelf and usage life of the metering valve. Specifically, it is contemplated that the construction of the on-can cavity 128 provides a longer sealing portion than current metering valves, providing a greater sealing area between the on-can cavity and the fuel cell valve stem 26. It is further contemplated that by enabling removal of the metering valve 86b from the adapter 84 when not in use, the shelf life of the metering valve is improved.

Alternate embodiments of the adapter, in-can cap and on-can valve are shown in FIGS. 10-14 and are generally designated 162, 164a and 164b, respectively. Similar to the adapter 84, the adapter 162 is configured for attachment to either the in-can cap 164a or the on-can metering valve 164b. Shared components of the adapter 84, in-can cap 86a and on-can valve 86b and the adapter 162, in-can cap 164a and on-can valve 164b, respectively, are designated with like reference numbers. Similarly, the comments above regarding the respective types of fuel cells 16, 16a usable with the respective caps and valves are applicable here.

Figures 11, 12:
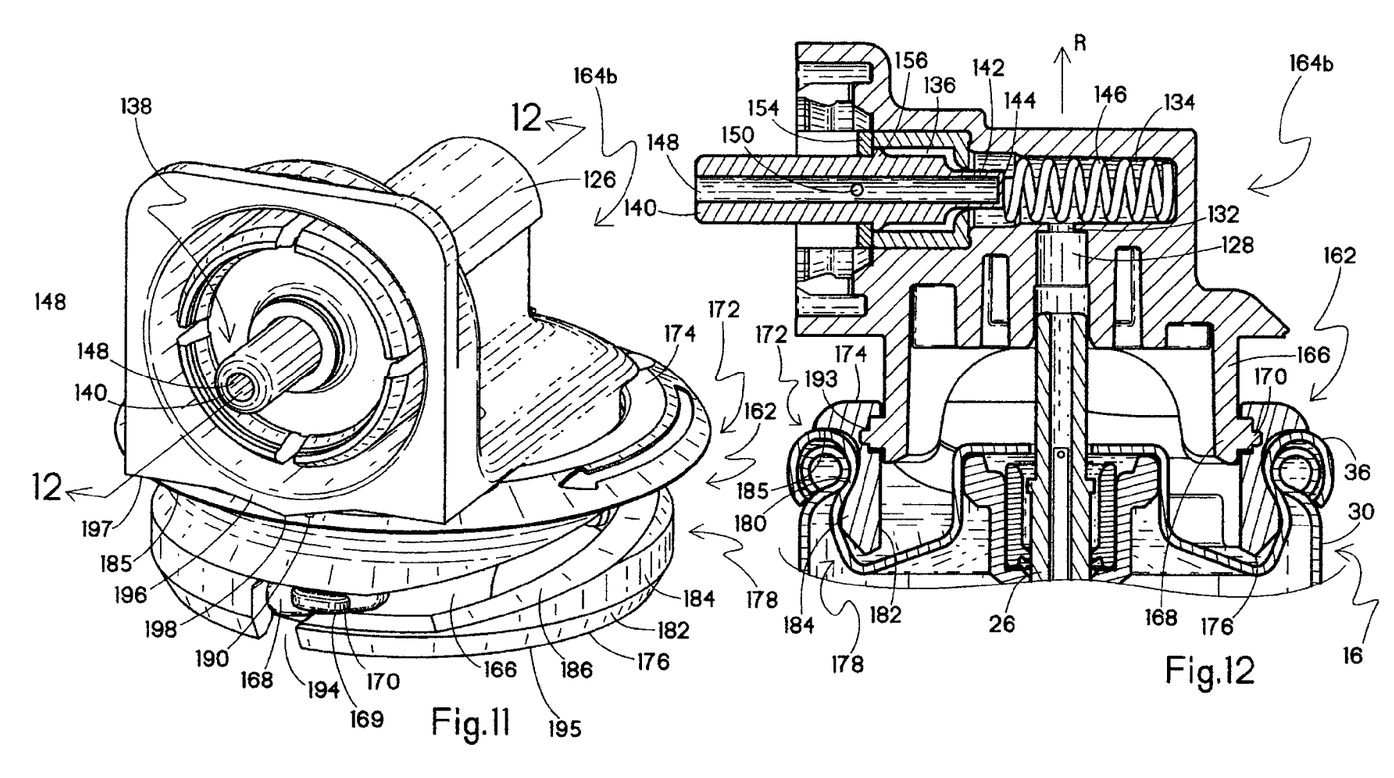
FIG. 11 is a front perspective view of an alternate embodiment of the on-can metering valve engaged with the adapter of FIG. 10.
FIG. 12 is a partial cross-section of the metering valve and adapter in FIG. 11 taken along the line 11-11 and in the direction indicated.
Figures 13, 14:
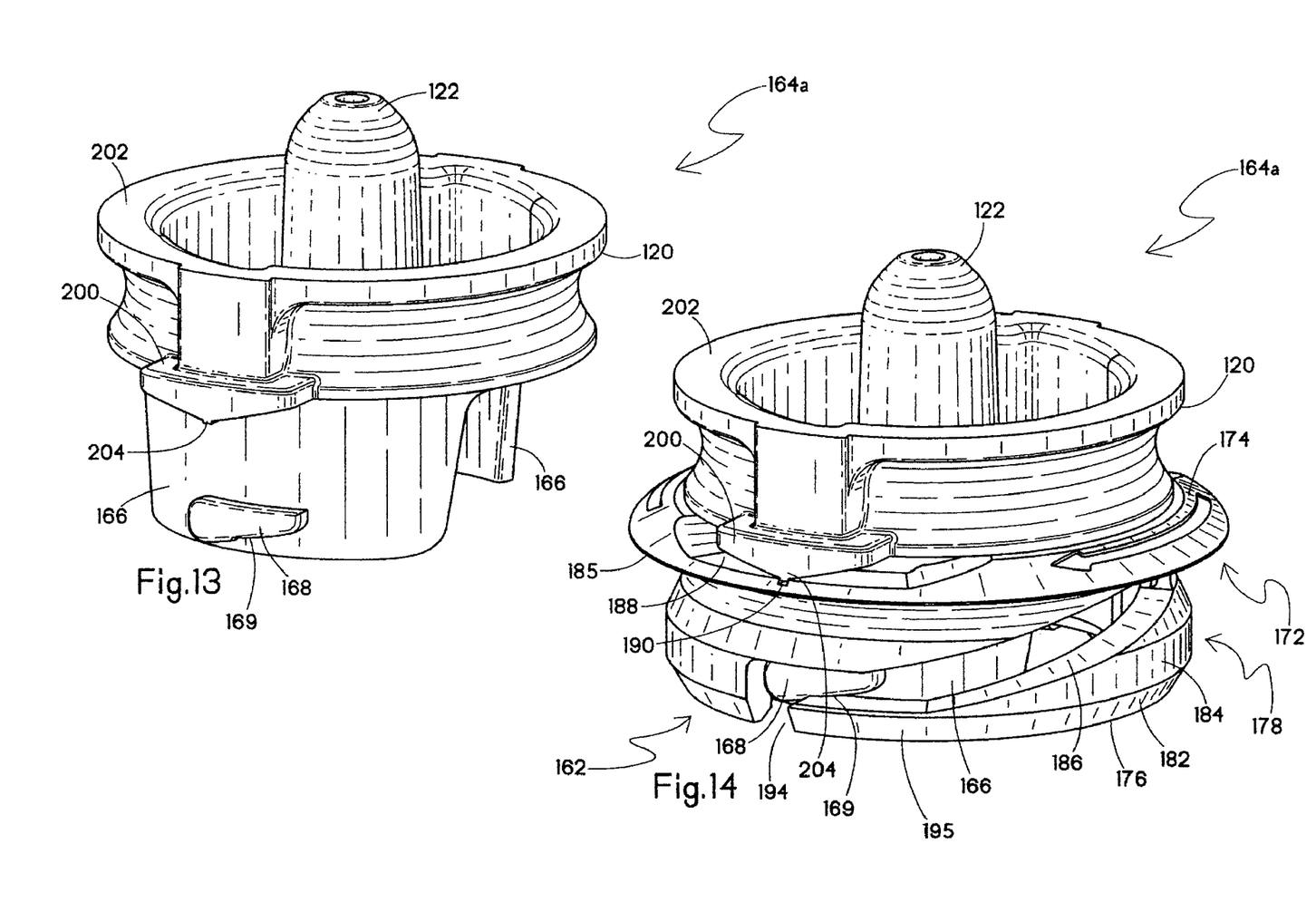
FIG. 13 is a top perspective view of an alternate embodiment of the in-can cap.
FIG. 14 is a front perspective view of the in-can cap of FIG. 13 engaged with the adapter of FIG. 10.

Each of the caps 164a, 164b include at least one and preferably a pair of oppositely located legs 166 depending from their respective cap bodies 120, 126, for providing balance to the caps. Each leg 166 includes a corresponding foot 168 extending radially outward from an end of each leg. As seen in FIGS. 11 and 13, the legs 166 depend from the cap body 120 or 126 in a direction generally parallel to the longitudinal axis "R" of the fuel cell 16 (FIG. 12), and the feet 168 extend generally perpendicular to their corresponding legs 166. The feet 168 of the on-can valve 164b each also includes a radially extending detent 170 extending generally parallel to the feet 168 and configured to provide a shipping position when mated with the detent 193 in ring 162. In order to prevent over-rotation, the feet 168 are configured to stop against the wall (no number) in track 186.

Similar to the adapter 84, the adapter 162 includes a ring portion 172 having a top edge 174, a bottom edge 176 and a sidewall 178 therebetween having an inner sidewall 180 and an outer sidewall 182. As seen in FIG. 12, the ring portion 172 is configured to grip the fuel cell closure 34 to be non-rotatable with respect to the fuel cell 16, preventing removal of or damage to the adapter 162 after installation. To enable such attachment to the fuel cell closure 34, the outer sidewall 182 defines a convex gripping formation 184 for providing a friction fit between the closure and the adapter (FIG. 12).

Figure 10:
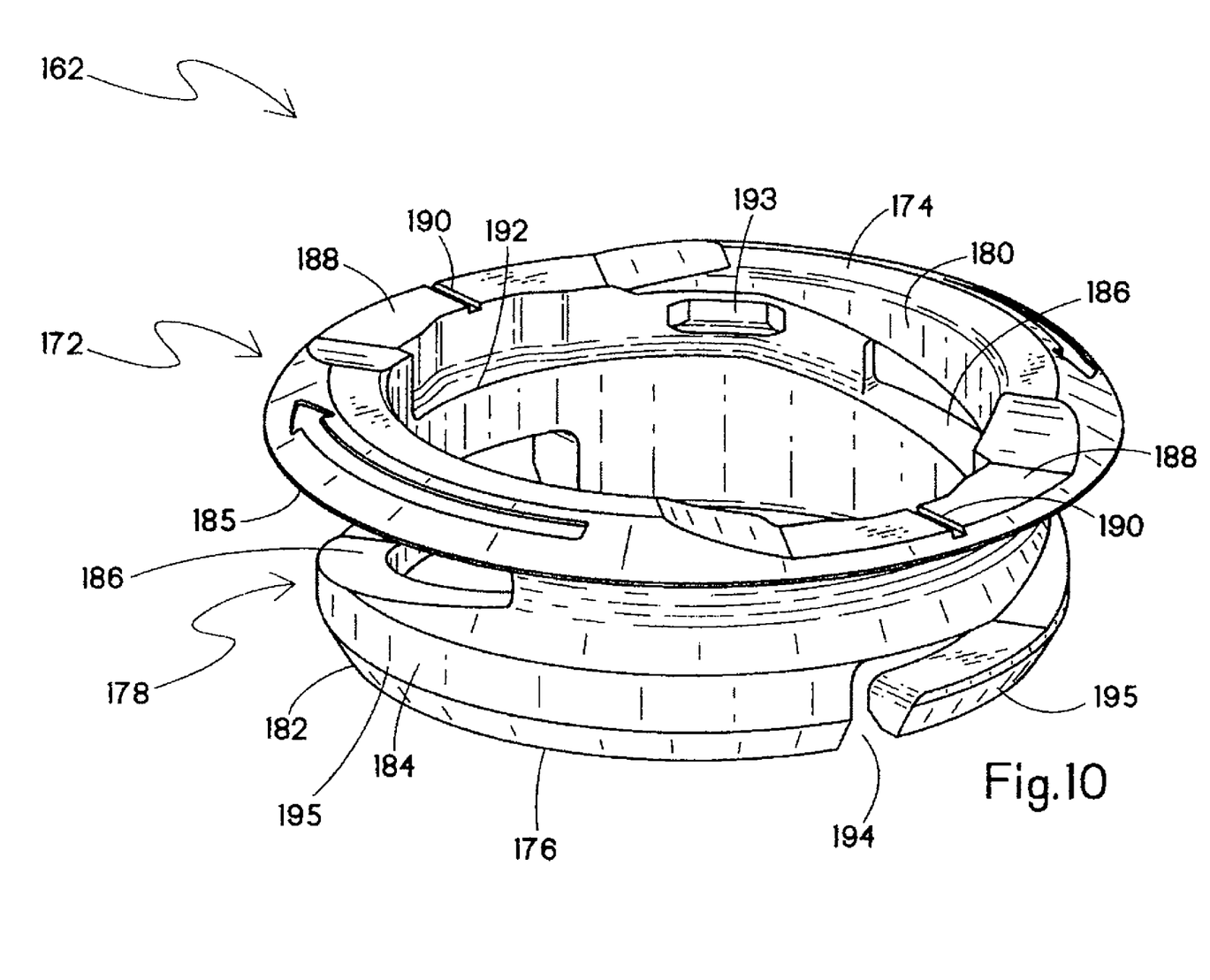
FIG. 10 is a top perspective view of an alternate embodiment of the adapter.

To further secure the adapter 162 to the cap 164a or 164b, the top edge 174 defines a lip 185 constructed and arranged for resting atop the peripheral edge 36 of the fuel cell closure 34 (FIG. 12). The lip 185 also provides a gripping point for the user during attachment of the cap 164a, 164b to the adapter 162, although it is recognized that other configurations may be suitable. The adapter 162 further includes a grooved portion that is at least one and preferably a pair of tracks 186 defined in the inner sidewall 180. The tracks 186 begin at opposing sides adjacent the top edge 174 and extend to the bottom edge 176 in opposing directions forming a spiral or helical configuration (FIG. 10). Each of the tracks 186 is sized to snugly receive a corresponding one of the feet 168, as seen in FIGS. 11 and 13.

Referring now to FIG. 10, the top edge 174 further includes at least one and preferably a pair of oppositely located generally V-shaped indentations 188 each defining a slot 190 centrally located therein for receiving a corresponding portion of the caps 164a, 164b, described in further detail below. The tracks 186 begin adjacent their respective indentations 188 and each include a seat 192 defined in the inner sidewall 180. Each seat 192 defines a beginning of a corresponding one of the tracks 186, and is constructed and arranged for receiving a corresponding one of the legs 166. A pair of notches 193 are each aligned with one of the pair of tracks 186 adjacent to a corresponding one of the seats 192, and are configured for receiving and securing a corresponding one of the detents 170 for providing a "shipping position" of the caps 164a or 164b relative to the fuel cell valve stem 26, which will be described in further detail below.

As the track 186 helically extends toward the bottom edge 176, its thickness increases such that it cuts through the outer sidewall 182, enabling the foot 168 to be securely held within and travel along the track. A recessed formation or gap 194 defines an end of each track 186 at the bottom edge 176, and is constructed and arranged for receiving the feet 168 and preventing over-rotation of the on-can valve 164b. To ensure proper balance, the indentations 188 are preferably in vertical alignment with a corresponding one of the gaps 194, although it is appreciated that other constructions may be appropriate, depending on the application.

Referring now to FIGS. 11 and 12, the on-can metering valve 164b includes the same internal components as the on-can valve 86b, which are described in detail above and accordingly will not be described here. The on-can valve 164b further includes at least one and preferably a pair of generally V-shaped projections 196 extending from a bottom 197 of the cap body 126, each configured for being received in a corresponding one of the indentations 188 of the adapter 162.

To attach the valve 164b to the adapter 162, the user aligns the valve with the valve stem 26 and aligns each cap foot 168 with the corresponding seat 192. Once properly aligned, the user turns the valve 164b, such that each foot 168 travels in its corresponding track 186. When the feet 168 are received in their corresponding gaps 194 and the end of a relatively flexible portion 195 of the adapter 162 mate with the recessed area 169 of each foot 168, the valve 164b is properly locked into the fuel cell 16, and is prevented from rotating relative to the adapter 162. The fuel cell can then be inserted into the fuel cell chamber 18 as shown in FIG. 3. The metering valve stem outlet 140 is then aligned with the fuel conduit 44, and fuel can travel to the combustion chamber 14 for fastener driving, as explained in detail above with respect to the on-can valve 86b.

The present fuel cell 16 is preferably sold such that the valve stem is in the closed position, preventing fuel leakage. Specifically, the fuel cell 16 is sold such that the detents 170 of the on-can valve 164b are received in respective notches 193, securing the cap to the adapter such that the valve stem 26 is not axially depressed (FIG. 12). Accordingly, to depress the valve stem 26 and place the fuel cell 16 in the "container fill" position, the user need only twist the valve 164b until the feet 168 are locked into place in the gap 194, respectively, as described above. By selling the fuel cell 16 with the valve 164b only partially attached to the adapter 162, fuel leakage is prevented, increasing efficiency and shelf life of the fuel cell.

It is also contemplated that the present adapter 162 can be utilized in on-can tools 70 that utilize an on-can fuel cell 16a. By providing a twist-and-lock attachment of an on-can metering valve (similar to valve 164b) to an on-can fuel cell utilizing the adapter 162, the valve stem is not damaged during assembly and fuel leakage is prevented. Specifically, to attach conventional on-can caps to the valve stem of an on-can cell, the user snaps the cap in place by first pushing one end of the cap into the fuel cell closure, and then snapping the other end of the cap. Such action causes the valve stem to laterally move or bend approximately 7° relative to its typical upright position, which can allow fuel to prematurely escape from the fuel cell, and impairs the ability of the fuel cell internal seals to effectively seal against leaks. By providing the present twist-and-lock attachment, the valve stem may be rotationally engaged, but it does not bend relative to its upright position, preventing leakage and increasing sealing area by at least 50% in comparison to conventional on-can metering valves for on-can fuel cells.

Accordingly, the present adapter 162 is configured for use on both in-can and on-can fuel cells, and in both in-can and on-can tools. Therefore, it is unnecessary for users that currently own on-can fuel cell compatible tools to purchase new in-can fuel cell compatible tools or additional adapters.

A feature of the present system is that the user can remove the cap 164a from the fuel cell by turning the cap relative to the adapter 162 such that the feet 168 disengage from their respective flexible portion of the ring and the feet 168 travel along their respective tracks 186 towards the top edge 174. When the feet 168 are aligned with their respective seats 192, the user pulls in a direction away from the fuel cell to disengage the hub 122 from the valve stem 26. The user can now attach valve 164b and use the fuel cell 16 in the on-can tool 70. Alternatively, the user can install the valve 164b or cap 164a on another adapter-equipped fuel cell.

As seen in FIGS. 13 and 14, the in-can cap 164a includes the same components as the cap 86a, described above in detail with respect to FIG. 4 and accordingly not described here. Similar to the valve 164b, the cap 164a also includes at least one and preferably a pair of projections 200 outwardly extending and downwardly depending from a top surface 202 of the adapter body 120 and substantially vertically aligned with a corresponding one of the legs 166. The projections 200 are preferably V-shaped and each include a generally centrally located protrusion 204 extending therefrom.

To secure the in-can cap 164a to the fuel cell 16, the user aligns the hub 122 with the valve stem 26 and also aligns the cap feet 168 with their corresponding seats 192. Once properly aligned, the hub 122 can be pushed onto the valve stem 26, and the cap 164a is turned such that the feet 168 travel along the tracks 186 until the feet 168 are received in their corresponding gaps 194, securing the cap to the valve stem and preventing rotation of the cap relative to the adapter 162. The user then inserts the fuel cell 16 into the fuel cell chamber 18 as shown in FIG. 2, permitting fuel to be dispensed to the combustion chamber 14, as described in detail above.

Preferably, the fuel cell 16 is manufactured and sold with the adapter 84 or 162 already attached thereto. Preferably still, the adapters 84, 162 are sold as part of a kit additionally containing the in-can fuel cell 16, the in-can cap 86a or 164a, and the on-can metering valve 86b or 164b, reducing the cost to the user and enabling the user to use the fuel cell 16 with both an in-can or an on-can tool 10, 70.

The present adapter is configured for attachment to both in-can and on-can fuel cells without the need for special tools. The same adapter is also configured for optionally receiving either an in-can cap or an on-can metering valve. Further, when used on an on-can fuel cell, the on-can metering valve is attached to the adapter in a specific shipping position that does not depress the valve stem, preventing fuel cell leakage. In addition, the present adapter increases the sealing length or interface between the on-can metering valve and the fuel cell, increasing shelf life.

While a particular embodiment of an interchangeable adapter for an in-can or an on-can fuel cell has been shown and described, it will be appreciated by those skilled in the art that changes and modifications may be made thereto without departing from the invention in its broader aspects and as set forth in the following claims.

The invention claimed is:

1. A fuel cell assembly for a fastener-driving tool, comprising:
   a fuel cell having a closure formation;
   an adapter including a ring portion configured for engagement upon said fuel cell closure formation and including a top edge, a bottom edge and a sidewall therebetween having an inner sidewall and an outer sidewall, said inner sidewall defining at least one track extending from said top edge to said bottom edge, and said outer sidewall having a convex gripping formation complementary to said closure formation; and
   a cap or metering valve constructed and arranged for being removably secured to said adapter and including a leg portion having a foot constructed and arranged for being received in said undercut portion.

2. The fuel cell assembly of claim 1 wherein said fuel cell is one of an in-can fuel cell and an on-can fuel cell.

3. The fuel cell assembly of claim 1 wherein said cap is one of an in-can cap and an on-can fuel metering valve.

4. The fuel cell assembly of claim 1 wherein said adapter further includes at least one notch, each notch defined in said inner sidewall adjacent to a corresponding one of said tracks and configured for receiving a corresponding foot for securing the adapter in a shipping position.

5. A fuel cell assembly for a fastener-driving tool, comprising:
one of an in-can fuel cell and an on-can fuel cell, each of said fuel cells having a closure formation;
an adapter including a ring portion configured for engagement upon said fuel cell closure formation and including a top edge defining at least one indentation, a bottom edge defining at least one gap in vertical alignment with said indentation, and a sidewall therebetween having an inner sidewall and an outer sidewall, said inner sidewall defining at least one track extending from said top edge to said bottom edge, and said outer sidewall having a convex gripping formation complementary to said closure formation; and
a cap constructed and arranged for being removably secured to said adapter and including at least one leg portion each having a foot constructed and arranged for being received in said track and a detent radially extending from said foot and configured for being received in said gap upon rotation of said cap relative to said adapter.

6. The fuel cell assembly of claim 5 wherein said cap is one of an in-can cap and an on-can fuel metering valve.

7. The fuel cell assembly of claim 5 wherein said at least one track is a pair of tracks, each track beginning at opposite sides of said top edge and extending in opposite directions to said bottom edge in a helical formation, said gap defining an end of said track.

8. An adapter configured for use in combination with a cap or metering valve on a fuel cell having a closure formation, the cap having at least one leg portion and a corresponding foot extending from the leg, comprising:
a ring portion configured for engagement upon the closure formation of the fuel cell and including a top edge, a bottom edge, and a sidewall therebetween having an inner sidewall and an outer sidewall;
a grooved portion defined by said inner sidewall, wherein said grooved portion is an arcuate undercut portion defined by said inner sidewall and adjacent to said bottom edge;
a convex gripping formation on said outer sidewall complementary to the closure formation; and
at least one recessed formation adjacent said grooved portion for receiving the foot.

9. The adapter of claim 8 further including a stop defining an end of said arcuate undercut portion, said stop being constructed and arranged for preventing rotation of the cap or metering valve foot past said stop.

10. The adapter of claim 9 wherein said undercut further includes at least one radially outwardly extending nodule spaced from said stop to define a space for receiving the foot upon completion of installation.

11. An adapter configured for use in combination with a cap or metering valve on a fuel cell having a closure formation, the cap having at least one leg portion and a corresponding foot extending from the leg, comprising:
a ring portion configured for engagement upon the closure formation of the fuel cell and including a top edge, a bottom edge, and a sidewall therebetween having an inner sidewall and an outer sidewall;
a grooved portion defined by said inner sidewall, wherein said grooved portion is at least one track defined in said inner sidewall and extending from said top edge to said bottom edge;
a convex gripping formation on said outer sidewall complementary to the closure formation; and
at least one recessed formation adjacent said grooved portion for receiving the foot.

12. The adapter of claim 11 wherein said at least one track is a pair of tracks, each track beginning at opposite sides of said top edge and extending in the same rotational direction to said bottom edge in a helical formation.

13. The adapter of claim 11 wherein said ring portion further includes at least one seat defined in said inner sidewall adjacent to said top edge, each said seat defining a beginning of each said track.

14. The adapter of claim 13 further including at least one notch, each notch defined in said inner sidewall adjacent to a corresponding one of said seats and configured for receiving a corresponding foot for securing the adapter in a shipping position.

15. An adapter configured for use in combination with a cap or metering valve on a fuel cell having a closure formation, the cap having at least one leg portion and a corresponding foot extending from the leg, comprising:
a ring portion configured for engagement upon the closure formation of the fuel cell and including a top edge, a bottom edge, and a sidewall therebetween having an inner sidewall and an outer sidewall, wherein said top edge defines at least one indentation constructed and arranged for receiving a corresponding projection of the cap or metering valve for properly aligning and securing the cap to the adapter, said projection being in vertical alignment with the cap or metering valve leg;
a grooved portion defined by said inner sidewall;
a convex gripping formation on said outer sidewall complementary to the closure formation; and
at least one recessed formation adjacent said grooved portion for receiving the foot.

16. The adapter of claim 15 wherein each said indentation defines a generally centrally located slot constructed and arranged for receiving a corresponding protrusion depending from said cap projection, for securely engaging the cap with the adapter.

17. An adapter configured for use in combination with a cap or metering valve on a fuel cell having a closure formation, the cap having at least one leg portion and a corresponding foot extending from the leg, comprising:
a ring portion configured for engagement upon the closure formation of the fuel cell and including a top edge, a bottom edge, and a sidewall therebetween having an inner sidewall and an outer sidewall;
a grooved portion defined by said inner sidewall;
a convex gripping formation on said outer sidewall complementary to the closure formation; and
at least one recessed formation adjacent said grooved portion for receiving the foot, wherein said recessed formation is a gap defined between opposing ends of said ring portion.

18. The adapter of claim 17 wherein the cap further includes a detent radially extending from the foot, said detent constructed and arranged for being received in said gap, securing the cap to the adapter.

* * * * *